United States Patent Office 3,149,082
Patented Sept. 15, 1964

3,149,082
CALCIUM PHOSPHATE CATALYSTS AND
METHOD OF PRODUCTION
Robert S. Bowman and Louis J. Piasecky, Pittsburgh, Pa., assignors, by mesne assignments, to The Baugh Chemical Company, Baltimore, Md., a corporation of Maryland
No Drawing. Filed Dec. 14, 1959, Ser. No. 859,119
10 Claims. (Cl. 252—437)

This invention relates to the catalytic dehydrogenation of organic compounds, and more particularly to the dehydrogenation of such compounds which normally are dehydrogenated with difficulty.

A primary object of the invention is to provide a method of catalytically dehydrogenating organic compounds that makes use of new catalysts that are more effective than those available heretofore but which require no substantial alteration in existing apparatus or procedure applied to such ends.

Another object is to provide such a method that is especially applicable to the catalytic dehydrogenation of primary and secondary alcohols to aldehydes and ketones, and which is particularly effective for the conversion of cyclohexanol to cyclohexanone.

Still another object is to provide improved catalysts for the dehydrogenation of organic compounds; that are easily prepared from readily available materials; that are highly efficient and of long active life; and which may be regenerated easily to restore them to full activity.

A further object is to provide catalysts in accordance with the immediately preceding object that are particularly adapted to the vapor phase dehydrogenation of organic compounds, especially those that are difficulty dehydrogenated.

A particular object is to provide efficient catalysts for the vapor phase dehydrogenation of cyclohexanol to produce cyclohexanone.

An object also is to provide a simple, easily practiced, economical and efficient method of making calcium phosphate catalysts.

Yet another object is to provide a method of base exchange activation of basic calcium phosphate catalysts available for the purposes of the invention.

A still further object is to provide a method of catalytically dehydrogenating hydrocarbons to produce alkenes in good yields by means of the catalysts provided by the invention.

A further object is to provide an efficient mode of vapor phase dehydrogenation of ethyl benzene to styrene.

The invention is predicated in part upon our discovery that certain basic calcium phosphates (BCP) afford excellent catalysts for the dehydrogenation of organic compounds when prepared and promoted as described hereinafter.

An important and critical factor of the invention is that the synthetic calcium phosphates of this invention be substantially more basic than tricalcium phosphate ($CaO:P_2O_5=1.18:1$). In other words, the phosphates of this invention must have a $CaO:P_2O_5$ weight ratio of at least 1.3:1 and ranging as high as 1.9:1.

These catalysts may be made by the addition of available phosphate to a water slurry of available lime. As a source of lime, we prefer to use calcium hydroxide [$Ca(OH)_2$] although other forms of reactive lime may be used. For most purposes, we prefer that the available phosphate be a solution of phosphoric acid ($H_3PO_4$), say at least twenty-five percent content of $H_3PO_4$, although for many purposes it is preferred that more concentrated solutions be used, say of fifty percent to seventy-five percent strength. Other sources of reactive phosphates may, of course, be used such, for example, as primary and secondary calcium phosphates. In the production of these catalysts, it is essential that the phosphate reactant be added to the aqueous slurry of lime at a rate such that the reaction medium remains alkaline during the addition. The reaction medium is, of course, agitated strongly during the precipitation of the calcium phosphate. The proportions of the reactants are such as to precipitate calcium phosphate of the basicity stated above.

A further major and critical feature of the invention is that the BCP produced is supplied with copper in one embodiment, or iron in another embodiment, by ion exchange. To this end there is added to the slurry of precipitated phosphate a soluble copper or iron salt, suitably $Cu(NO_3)_2$ or $Fe(NO_3)_3$. Chlorides are less desirable because it is more difficult to wash out the chloride ion, which tends to exert a poisoning action, than the nitrate ion which in any event is decomposed during heating of the catalyst. Other heat decomposable copper and iron salts, such as the acetates, that will undergo ion exchange with the BCP may be used.

The ion exchange reaction has been found to proceed to completion with conversion of an amount of the BCP to copper or iron phosphate, as the case may be, equivalent to the amount of copper supplied by ion exchange.

At the end of the ion exchange reaction the product is filtered, water washed to remove the calcium salt (e.g. $Ca(NO_3)_2$) produced by the ion exchange, and then dried. The dried product is pulverized, pelletized, suitably into pellets of 1/8" to 3/16" size, and then calcined in air, at, for example, 1000° F. for about one hour. The catalyst is then ready for use.

In the preparation of these catalysts, any calcium hydroxide in excess of the 1.9 $CaO:P_2O_5$ weight ratio appears simply as unreacted calcium hydroxide, and we have observed no obvious advantage in catalysts containing such calcium hydroxide in excess of that ratio. Consequently that ratio represents the saturation point in the $CaO-P_2O_5$ system.

As evidencing the value of these catalysts, reference may be made to a series of tests in which calcium phosphates of varying weight ratios of $CaO:P_2O_5$ were prepared by the foregoing procedure and ion exchanged with cupric nitrate. These were used for the dehydrogenation of cyclohexanol using 50 cc. bed volumes, 6 inches high, in 7/8 inch i.d. reactor tubes at a temperature of 350° C. with a steam-cyclohexanol feed in which the steam-cyclohexanol mole ratio was 14.3:1. The feed rates in all of these tests were such that the average residence time in the catalyst bed was 0.55 to 0.60 second, which corresponds to a total liquid space velocity of water and cyclohexanol of about three volumes of total liquid feed per volume of catalyst bed per hour. The results are as shown in Table I.

TABLE I

Effect of $CaO-P_2O_5$ Weight Ratio on Cyclohexanol Dehydrogenation

| $CaO-P_2O_5$ (wt. ratio) | Wt. Percent Copper | Mole Percent to cyclohexanone | Conversion to cyclohexene | Cyclohexanone: Cyclohexene |
|---|---|---|---|---|
| 1.18 | 5.0 | 0 | 100 | 0 |
| 1.40 | 5.0 | 44 | 26 | 1.7 |
| 1.60 | 5.0 | 42 | 21 | 2.0 |
| 1.90 | 5.0 | 60 | 1 | 60 |

These data shown first that tricalcium phosphate (1.18 ratio) is useless for the purposes of the invention for the action is exclusively dehydrating. Next they show that to obtain substantial dehydrogenation of this alcohol it is necessary that the mole ratio of the phosphate be at least, and preferably greater than about 1.3:1. They show further that as the ratio is increased the dehydrogenating efficiency increases until at the 1.9 ratio there is obtained almost exclusive dehydrogenation to the desired product, cyclohexanone, while a sharp break in performance occurs at and beyond the 1.5 ratio stage.

Catalyst at and approaching the 1.9 ratio when made in the manner just described is somewhat difficult to filter and wash economically in plant scale operations. We have discovered, however, that this difficulty in the production of highly basic calcium phosphates may be avoided by a novel double-stage precipitation. In the first stage, a relatively coarse and easily filterable precipitate is prepared by using lime and phosphoric acid in proportions productive of tricalcium phosphate $[Ca_3(PO_4)_2]$. In the second stage, the resultant water slurry is hydrolyzed by the incremental addition of calcium hydroxide to the stirred slurry until the amount necessary to raise the $CaO:P_2O_5$ weight ratio to 1.9 has been added. This material filters easily and so is water washed easily. The dried powder has improved flow characteristics and is more easily pelletized or extruded than that made in a single stage, and it gives harder and more dense pellets. This product is believed to be a phosphate the particles of which possess neutral or slightly alkaline interiors upon which are deposited very highly alkaline, fully lime saturated layers of BCP. The product may be dried at 100°–105° C., and it may be calcined in air at about 1000° C. At this point, the ion exchange reaction is initiated and the production of the catalyst is completed as described above.

We have found that catalysts prepared in this manner and activated by copper are of outstanding value for the dehydrogenation of cyclohexanol to cyclohexanone, not only in exceptionally good yield but also with virtually complete suppression of side reactions such, for example, as the production of phenol and cyclohexene. We find that the concentration of copper in the catalyst may range from about two to twenty percent by weight, with the optimum range being about five to ten percent based upon the original weight of phosphate subjected to ion exchange. This basis of expressing amounts of copper and iron is used throughout this specification and in the claims for it simplifies this factor. The reason for this is that the ion exchange reaction results in conversion of a portion of the BCP to a soluble calcium salt so that there is less calcium phosphate in the finished catalyst that was present at the beginning of the ion exchange reaction. Consequently, calculation would be necessary to determine the amount of calcium phosphate converted to soluble salt and then a calculation to determine the concentration of copper in the product. This would be complicated further by the use of a potassium salt, as described later, since it would act as a diluent and require further calculation. Accordingly, the simplest manner of referring to copper and iron contents is to base it on the original $CaO:P_2O_5$, i.e. that present when the ion exchange reaction is initiated.

In addition to the above-mentioned improvements in physical properties and handling characteristics, the copper activated double-stage 1.9 ratio BCP catalyst was found to have even better cyclohexanol dehydrogenation activity and selectivity as compared with the single stage precipitation described above. For example, whereas the previously described single-stage 1.9 ratio catalyst affords a 60 mole percent conversion to cyclohexanone and 1 mole percent to cyclohexene, the double-stage 1.9 ratio catalyst, under the same operating conditions, effects a 75 mole percent conversion to cyclohexanone and only 0.6 mole percent to cyclohexene. The cyclohexanone-cyclohexene mole ratio is therefore increased to 125. Thus, the double-stage procedure for preparing a BCP catalyst can be said to improve not only the handling and physical characteristics of the catalyst, but also the cyclohexanol dehydrogenating activity and selectivity.

The data of Table I indicate that there is a relationship between the dehydrogenation activity and selectivity and high surface alkalinity. We have also found that a further increase in surface alkalinity results in even higher dehydrogenation activity and selectivity. This, we believe, is due to the dehydrogenation proceeding through adsorption on highly alkaline sites on the catalyst surface. This concept is supported by the addition of two percent by weight of potassium, as potassium carbonate $(K_2CO_3)$, to a 1.9 weight ratio BCP produced by the double stage precipitation and activated with copper as a result of which the conversion of cyclohexanol to cyclohexanone was increased to 91 mol percent with only trace amounts of cyclohexene. Thus, a further increase in alkalinity effects even higher dehydrogenation activity and selectivity. The experimental conditions of this test were the same as described in connection with Table I.

For the purposes of the invention, two percent of potassium, supplied by about 3.5 percent of potassium carbonate, suffices and appears to be optimum for this reaction. Depending on the particular reaction, the potassium may, however, range from about 2 to 15 percent by weight on the basis explained above.

Actually, the potassium appears to exert a synergistic effect. Thus, under the test conditions of Table I a 40-minute on-stream operation using catalyst containing 8 percent of copper resulted in an 81 percent conversion of cyclohexanol to cyclohexanone; the same Cu–BCP catalyst with 2 percent of potassium gave a 91 percent yield, while a K–BCP catalyst gives essentially catalyst gives essentially zero efficiency. In these runs the bed was at 250° C. and there was used a total liquid feed rate space velocity of 3 for 40-minutes on stream.

A catalyst which is even more active than the one described above was obtained by the addition of a small quantity of rhodium, by ion exchange, 0.25 percent by weight, to the copper-potassium BCP formulation. The rhodium may range from 0.05 to 2 percent on the basis stated above.

Using a liquid space velocity of 6 volumes of total water-cyclohexanol feed per volume of catalyst per hour, giving a cyclohexanol contact time of about 0.25 second, the rhodium-containing catalyst converted 83 percent of the cyclohexanol to cyclohexanone at the 40 minute on-stream point. At the 90 minute on-stream point, the conversion was still 81 mole percent. Under these same conditions, the copper-potassium-BCP catalyst converted 68 and 19 percent of the cyclohexanol to cyclohexanone at the 40 and 100 minute on-stream points, respectively.

The rhodium-containing catalyst is prepared simply by adding the required quantity of rhodium, e.g. as rhodium trichloride, to the cupric nitrate solution. Both metals are then incorporated into the BCP structure by ion exchange, using the previously described procedure. The catalyst is then filtered, washed, dried, mixed with potassium carbonate, and pelletized. After calcining at 1000° F., it is ready for use.

A surprising result of these double precipitated catalysts activated with copper-potassium and copper-potassium-rhodium is that they function best at abnormally low bed temperatures, e.g. 240° to 260° C., for longer periods of time and at a higher selectivity level than at the bed temperatures of Table I that would normally be used with the single precipitation BCP catalyst. The advantage of this feature, apart from heat economy, appears from the data of Table II. Here there was used a double precipitated catalyst carrying 8 percent of copper and 2 percent of potassium.

TABLE II

*Effect of Bed Temperature on the Dehydrogenation of Cyclohexanol Over 8% Cu-2% K Catalyst*

| Bed Temp., °C. | Mole Percent Conversion to Cyclohexanone at— | | | Mole Percent Conversion to Phenol at— | | |
|---|---|---|---|---|---|---|
| | 40 min. | 120 min. | 200 min. | 10 min. | 40 min. | 120 min. |
| 350 | 90.7 | 66.2 | | 4.1 | 1.9 | 0.0 |
| 300 | 92.9 | 83.9 | | 0.7 | 1.3 | 0.0 |
| 260 | 93.0 | 90.3 | 72.9 | 0.0 | 0.7 | 0.0 |
| 240 | 82.1 | 83.4 | 63.8 | 0.0 | 0.0 | 0.0 |

The conditions again include the use of the previously described steam-cyclohexanol feed stream at a total liquid space velocity of about 3, which produces a cyclohexanol contact time of about 0.55 second.

The above data clearly show the optimum bed temperature to be at 260° C. at which temperature the greatest per-pass conversion to cyclohexanone at a very high selectivity level is achieved. Since only trace quantities of cyclohexene and phenol are detected in the products, the ultimate conversion to cyclohexanone at 260° C. is about 99 percent.

A further improvement in the work capacity of the copper-potassium BCP catalyst was attained by using a dry feed stream composed only of cyclohexanol vapor. Although the condition does not favor as high a per-pass conversion as the steam diluted cyclohexanol feed (because of equilibrium considerations), it effects other advantages. These include a higher work capacity of the catalysts in terms of units of product per volume of catalyst per unit time.

The term space yield, defined as pounds of cyclohexanone produced per cubic foot of catalyst bed volume per hour, will be introduced here as the unit of measuring a catalyst work capacity. The data of Table III, obtained with the catalyst of Table II, show the comparison between the wet and dry cyclohexanol feed systems.

TABLE III

*Comparison Between Steam-Cyclohexanol and Dry Cyclohexanol Feed Systems in the Catalytic Dehydrogenation of Cyclohexanol at 260° C.*

| Feed | Mole Percent Conversion to Cyclohexanone at— | | | Space Yield of Cyclohexanone, lbs.cu.ft./hr. at— | | |
|---|---|---|---|---|---|---|
| | 40 min. | 120 min. | 200 min. | 40 min. | 120 min. | 200 min. |
| Steam cyclohexanol [1] | 93.0 | 90.3 | 72.9 | 46.8 | 45.0 | 36.5 |
| Dry cyclohexanol [2] | 80.5 | 78.0 | 72.5 | 160 | 153 | 141 |

[1] Steam-cyclohexanol mole ratio=14.3; total liquid space velocity=app. 3.
[2] Liquid space velocity=app. 3.

The total production of the ketone during longer runs was as follows:

TABLE IV

| Feed | Production lbs./cu.ft. catalyst | |
|---|---|---|
| | 4 Hours | 6 Hours |
| Steam-cyclohexanol | 172 | 200 |
| Dry cyclohexanol | 603 | 834 |

In each case, only trace quantities of by-products were formed. It is therefore evident that, at the expense of a somewhat higher recycle load, the work capacity of the catalyst can be improved about four-fold by using the single component feed, cyclohexanol vapor. Further, it is evident that the rate of cyclohexanone production using the steam-cyclohexanol feed drops off at a faster rate after the two-hour mark. Therefore, the dry feed system allows a longer on-cycle time. Other advantages of the dry cyclohexanol feed system include a less complicated recovery and recycle process, and the use of less total heat for the entire operation.

Regeneration of the catalyst involves a simple air-burning process. The spent catalyst bed while at temperature is purged of organic vapors by steam or nitrogen gas, after which air is introduced into the gas stream at such a rate that the rise in catalyst bed temperature does not exceed about 200° C., i.e., a bed temperature of about 460° C. Lengthy air treatment is not required for full regeneration of the catalyst activity. From one-half to one hour on the partial air stream is sufficient to restore full activity to the catalyst. The catalyst bed, after purging the air with steam or nitrogen, and after cooling to about 260° C., is then ready for the next dehydrogenation cycle. After 30 cycles of use and regeneration, the 8% Cu-2% K catalysts continues to maintain high, steady performance.

As an example of the production of a 1.9 ratio 8% Cu-2% K catalyst, the following is given:

Stage 1—406 ml. of 3.11 molar phosphoric acid, containing 89.6 g. $P_2O_5$, is added with efficient stirring to a slurry of 138 g. calcium hydroxide containing 103 g. CaO, in 1500 ml. of water. The product is a 1.15 CaO-$P_2O_5$ weight ratio calcium phosphate.

Stage 2—After standing for about one-half hour, the stage 1 mixture is hydrolyzed to a 1.9 CaO-$P_2O_5$ weight ratio by the incremental addition, with stirring, of 90.5 g. of dry calcium hydroxide, containing 67 g. of CaO. A water solution of 79.0 g. cupric nitrate hydrate ($Cu(NO_3)_2 \cdot 3H_2O$) is then added slowly to the stirred mixture. This quantity of cupric nitrate places an amount of copper equal to 8 percent of the total CaO and $P_2O_5$ present prior to the ion exchange on the surface of the BCP.

The above reaction mixture, after standing for one-half hour, is then filtered and water washed until about 80 percent or more of the nitrate ion has been removed. The product is then air dried to 30 to 35 percent moisture content in an oven at 100 to 150° C. The product is then pulverized, and 10.4 g. of powdered potassium carbonate are thoroughly blended into the material. The total product is pelletized, usually into ⅛ or ³⁄₁₆ inch pellets, by use of either pilling or extrusion machines. The pelleted product is activated by calcining at 1000° F. for one hour.

Although we prefer the double-stage precipitation described above, using copper nitrate as the source of copper, the invention is not so restricted. Thus single stage BCP catalysts in accordance with the invention and other variants of the double-stage procedure are within the scope of the invention. Thus, the catalytic effect of copper may be assisted or enhanced by other activating agents such as iron, chromium, nickel and rhodium salts in which the anion may be either organic or inorganic (preferably not the chloride).

Furthermore, although the fully saturated BCP catalysts (1.9:1 ratio) are preferred for alcohol dehydrogenation, the invention is not so limited provided the CaO:$P_2O_5$ weight ratio is higher than that for tricalcium phosphate (1.18 ratio).

The catalysts of the invention are adapted generally to the dehydrogenation of both primary and secondary alcohols. Thus, the 8 percent copper-2 percent potassium double precipitated and activated phosphates have been used successfully for the dehydrogenation of n-amyl alcohol to valeraldehyde, of 4-methyl-2-pentanol to 4-methyl-2-pentanone, and of secondary butyl alcohol to methyl ethyl ketone. We believe that these catalysts are outstandingly effective for use in performing delicate dehydrogenation reactions in competition with strongly probable and undesirable side reactions. This catalyst is particularly useful for converting primary and secondary alcohols to aldehydes and ketones, respectively, and, where structures permit, as in the case of cyclohexanol, the catalyst has dehydro-aromatizing ability. Thus under proper conditions this catalyst and its modification with rhodium will convert cyclohexanol to phenol.

Another embodiment of the invention that is particularly useful for the production of styrene from ethyl benzene as well as for the conversion of the n-butenes to 1,3-butadiene under more severe conditions in the presence of steam at high temperature is a calcium phosphate in accordance with the invention, preferably of the 1.9 ratio, that is activated with iron, instead of copper, and as in the preceding embodiment contains potassium also. Under such conditions the catalyst must maintain a high order of structure stability. This catalyst is produced in the manner described above and iron is supplied by ion exchange with, for example, ferric nitrate.

A BCP catalyst under the invention that has very good resistance to structure collapse during steam sintering is a 1.9 $CaO\text{-}P_2O_5$ weight ratio, double-stage BCP containing about 12 percent iron from ion exchange and 10 percent potassium carbonate. The importance of using a particular combination of $CaO\text{-}P_2O_5$ ratio and iron content to achieve this stability is revealed in the following table.

TABLE V

Effect of $CaO\text{-}P_2O_5$ Weight Ratio and Iron Content on Catalyst Structural Stability and Ethylbenzene Dehydrogenation Activity

| Catalyst | $CaO\text{-}P_2O_5$ Ratio | Percent Iron | Percent Volume Shrinkage Upon Steam Sintering[1] | B.E.T. Surface Area in $m.^2/g$. After Steam Sintering[2] | Styrene Space Yield, lbs./cu./ft. Catalyst/hr. |
|---|---|---|---|---|---|
| A | 1.7 | 12 | 10 | 21.3 | 10.7 |
| B | 2.1 | 12 | 23 | 10.1 | 13.0 |
| C | 1.9 | 12 | 2 | 32.5 | 15.0 |
| D | 2.1 | 20 | 13 | 18.8 | 7.8 |
| E | 1.9 | 20 | 18 | | 1.6 |

[1] One-half hour at 700° C. in a full atmosphere of steam.
[2] Total surface area as determined by nitrogen adsorption. The surface area of these catalysts before steam sintering is about 72 $m.^2/g$.

The data show that a 12 percent iron-containing catalyst built on a 1.9 $CaO\text{-}P_2O_5$ double-stage BCP, has very good stability. It is the best in the group. It is also noted that this catalyst C has the best ethylbenzene dehydrogenating activity. More iron, and/or a higher or lower $CaO\text{-}P_2O_5$ weight ratio produce a less stable and less active catalyst. In this work, at an average bed temperature of 600° C., ethylbenzene and water, at the rates of 1.0 g. and 1.5 g. per minute, respectively, are passed through a 100 cc. bed of catalyst composed of steam sintered, 3/16 inch pellets. These conditions provide a water to ethylbenzene mole ratio of about 9 to 1, and an ethylbenzene contact time of 0.9 second, calculated as residence time in the catalyst bed. Thus, a close duplication of the operating conditions in a commercial styrene from ethylbenzene plant is achieved. The yield of styrene is calculated as space yields (pounds of styrene per cubic foot of catalyst bed volume per hour). Under the above flow conditions, a styrene space yield of 15 is attained at a 40 percent conversion level. The above data apply to runs made over 1 to 4 days. The more active catalysts were run continuously for four-day periods.

The iron in the catalysts of this embodiment may range from about 10 to 15 percent.

The catalysts of Table V were prepared by a procedure similar to that described for the copper-potassium alcohol dehydrogenation catalyst described above. In each case, a 1.9 $CaO\text{-}P_2O_5$ weight ratio was prepared by the double-stage technique. The iron was incorporated onto the surface of the BCP by ion exchange, whereby a solution of ferric nitrate was brought in contact with the 1.9 weight ratio BCP. After filtration and washing to remove most of the nitrate ion (as calcium nitrate) the product was dried to 30 to 35 percent moisture, pulverized, mixed with an amount of potassium carbonate equal to 10 percent of the dry weight of the BCP, and then pelletized. The catalyst was then stabilized by steam sintering for one-half hour at 700° C.

Even greater dehydrogenation activity can be achieved by modifying the C catalyst of Table V. To accomplish this, small quantities of chromium, or chromium and copper, are incorporated into the catalyst structure. The detailed procedure for preparing this catalyst, called type F, now follows:

To a slurry of 160 g. of calcium hydroxide, containing 120 g. of CaO, in 1500 ml. of water are added, with good stirring, 499 g. of phosphoric acid solution containing 100 g. $P_2O_5$. The product is a 1.20 wt. ratio calcium phosphate. After one-half hour, 94 g. of calcium hydroxide, containing 70 g. CaO, are added in small increments to the above mixture. The resulting mixture, a slurry of 1.9 wt. ratio calcium phosphate is allowed to stand for one-half hour. A water solution of 252 g. $Fe(NO_3)_3 \cdot 9H_2O$, 22.1 g. $Cu(NO_3)_2 \cdot 3H_2O$, and 22.3 g. $Cr(NO_3)_3 \cdot 9H_2O$ is then added to the stirred mixture. This operation incorporates 12 percent iron, 2 percent copper, and 1 percent chromium into the catalyst. After standing one-half hour, the mixture is filtered and water washed until at least 80 percent of the total nitrate ions have been removed. The product is air dried to 20 to 30 percent moisture in an oven at 105° C., after which it is pulverized and then blended with 29 g. of $K_2CO_3$. This provides 10 percent $K_2CO_3$. The product is then pelletized into 3/16 inch pellets, by use of either pilling or extrusion machines. The catalyst pellets are activated by steam sintering at 700° C. for one-half hour or more. This type catalyst, over a four-day period, will afford an average space yield of 18.5 lbs. of styrene/cu. ft. of catalyst/hr., at a conversion level of 50 percent, at an average bed temperature of 600° C.

Another catalyst which has a high order of structural stability, and which has good ethylbenzene dehydrogenation activity, can be made as follows. Freshly precipitated iron hydroxide is prepared by the stirred addition of a water solution of ferric nitrate to a water slurry of calcium hydroxide. A known excess of calcium hydroxide is employed so that after the ferric hydroxide formation phosphoric acid is added until the BCP portion of the catalyst reaches a $CaO\text{-}P_2O_5$ weight ration of 1.7. This catalyst is, in effect, a 1.7 ratio single-stage BCP precipitated upon freshly prepared ferric hydroxide. Unlike a single-stage 1.7 ratio BCP, this iron-BCP catalyst filters and can be water washed with relative ease.

The requirements of a particular BCP structure for catalyst stability and activity is again evident upon inspection of the following data which were obtained on a series of catalysts prepared by the above procedure.

TABLE VI

Effect of $CaO\text{-}P_2O_5$ Weight Ratio on Catalyst Stability and Activity

| Catalyst | $CaO\text{-}P_2O_5$ Ratio | Wt. Percent Iron in Catalyst | Wt. Percent $K_2CO_3$ | Volume Percent Shrinkage Steam Sintering[1] | Average Styrene Space Yield, lbs./cu.ft./hr. |
|---|---|---|---|---|---|
| 8A | 1.4 | 12.0 | 10 | 5.5 | 5.1 |
| 9A | 1.7 | 12.0 | 10 | 3 | 14.8 |
| 10A | 1.9 | 12.0 | 10 | 11 | 13.3 |

[1] One-half hour at 700° C. in a full atmosphere of steam.

The data show, generally, that, like the alcohol dehydrogenation catalyst with 8 percent copper and 2 percent potassium, the best performance is achieved at high CaO-$P_2O_5$ weight ratios. Thus, at or near the BCP "saturation" point is considered the best range for the BCP dehydrogenation catalysts. The data also indicate again that maximum catalyst performance attends maximum catalyst structure stability.

The detailed procedure for preparing the 9A catalyst will now follow. A water solution of 286 g. of ferric nitrate ($Fe(NO_3)_3 \cdot 9H_2O$) is added with stirring to a slurry of 303 g. of calcium hydroxide in 2000 ml. of water. To this stirred mixture of ferric hydroxide and excess calcium hydroxide are added 499 ml. of phosphoric acid containing 100 g. of $P_2O_5$ equivalent. The mixture is then filtered and water washed to remove the nitrate ions. The wet product is then re-slurried in water, after which 36.6 g. of potassium carbonate in water solution are added, with stirring. The mixture is then dried at 105–110° C., pulverized, and pelletized. After steam sintering at 700° C. for one-half hour, the catalyst is ready for use.

From the information presented on the two types of potassium promoted iron-BCP dehydrogenation catalysts it is evident that we are not restricted to (a) the manner and sequence of BCP precipitation; (b) the nature and sequence of incorporation of ferric salts or ferric oxide in the catalyst; (c) the type of iron employed, whether it be as soluble iron salts, as any of a series of ferric oxides, or freshly precipitated ferric hydroxide; and (d) the manner in which the potassium carbonate is incorporated in the catalyst.

As a final note to emphasize the versatility of our calcium phosphate catalysts, as a function of the particular calcium phosphate structure, it is pertinent to recall the instance where a tricalcium phosphate, activated with 5 percent copper (Table I), functions very efficiently as an alcohol dehydrating catalyst. This catalyst, at 350° C. in the presence of steam, converts cyclohexanol quantitatively to cyclohexene.

In the foregoing examples potassium carbonate was added to increase the surface alkalinity of the catalyst. This function is attainable with other potassium compounds such, for example as the hydroxide or the nitrate, the latter being decomposed to form the oxide during calcination of the pellets.

According to the provisions of the Patent Statutes, we have explained the principle and mode of practicing our invention and have described what we now consider to represent its best embodiment. However, we desire to have it understood that, within the scope of the appended claims, the invention may be practiced other than as specifically described.

We claim:

1. That method of making a dehydrogenation catalyst comprising the steps of adding to an aqueous calcium hydroxide slurry a solution of a phosphate selected from the group consisting of orthophosphoric acid and monocalcium phosphate at a rate such that the slurry remains alkaline, the amounts of said phosphate and of said slurry being such as to precipitate calcium orthophosphate of CaO:$P_2O_5$ weight ratio of about 1.3:1 to 1.9:1, then adding an aqueous solution of a compound of a metal selected from the group consisting of copper and iron in an amount to form by ion exchange with the calcium phosphate, orthophosphate of said metal containing from 2 to 20% by weight of the metal as the phosphate based on the weight of precipitated calcium phosphate, washing and drying the product, adding to said product about 2 to 15% by weight, based on the precipitated calcium phosphate, of an inorganic potassium compound decomposable to potassium oxide by heat, pelletizing the mixture, and calcining the pellets at about 1,000° C.

2. A method according to claim 1, said potassium compound being the carbonate.

3. A method according to claim 1, said phosphate being orthophosphoric acid.

4. A method according to claim 1 in which said phosphate is orthophosphoric acid and is first added in an amount to precipitate tri-calcium phosphate following which dry calcium hydroxide is added incrementally to convert said phosphate to a basic calcium phosphate in which the weight ratio CaO:$P_2O_5$ is about 1.6:1 to 1.9:1.

5. That method of making a dehydrogenation catalyst comprising the steps of adding to an aqueous calcium hydroxide slurry a solution of phosphate selected from the group consisting of orthophosphoric acid and monocalcium phosphate at a rate such that the slurry remains alkaline, the proportions of phosphate and slurry being such that the CaO:$P_2O_5$ weight ratio of the calcium phosphate formed is about 1.18:1, then adding dry calcium hydroxide incrementally to bring the said ratio to about 1.3:1 to 1.9:1, then adding an aqueous solution of a compound of a metal selected from the group consisting of copper and iron in an amount to supply, by ion exchange with the calcium phosphate from 2 to 20% by weight of said metal as phosphate based on the weight of said calcium phosphate, washing and drying the product, adding to the dry product about 2 to 15% by weight, based on the calcium phosphate, of an inorganic potassium compound decomposable by heat to potassium oxide, pelletizing the mixture, and calcining the pellets at about 1,000° C.

6. A method according to claim 5, said potassium compound being the carbonate.

7. A dehydrogenation catalyst consisting essentially of (1) a synthetic calcium orthophosphate in which the weight ratio CaO:$P_2O_5$ is from about 1.3:1 to 1.9:1, (2) a phosphate of the group consisting of copper orthophosphate in an amount containing about 2 to 20% by weight of copper as the phosphate, based on (1), an iron phosphate in an amount containing about 5 to 15% by weight of iron as phosphate based on (1), and (3) $K_2O$ by analysis equivalent to about 2 to 15% by weight of an inorganic salt of potassium decomposable by heat to the oxide based upon (1).

8. Catalyst according to claim 7 also containing rhodium phosphate in an amount providing from about 0.02 to 2 percent by weight of rhodium as phosphate based upon (1).

9. A dehydrogenation catalyst consisting essentially of (1) a synthetic calcium orthophosphate in which the weight ratio CaO:$P_2O_5$ is from about 1.3:1 to 1.9:1, (2) $K_2O$ by analysis equivalent to from about 2 to 15% by weight of an inorganic salt of potassium decomposable by heat to the oxide based upon (1), and (3) copper phosphate in an amount containing about 5 to 10% by weight of copper as phosphate based on (1).

10. A dehydrogenation catalyst consisting essentially of (1) a synthetic calcium orthophosphate in which the weight ratio of CaO:$P_2O_5$ is from about 1.3:1 to 1.9:1, (2) $K_2O$ by analysis equivalent to from about 2 to 15% by weight of an inorganic salt of potassium decomposable by heat to the oxide based upon (1), and (3) iron orthophosphate in an amount containing about 5 to 15% by weight of iron as phosphate based upon (1).

References Cited in the file of this patent

UNITED STATES PATENTS

| | | |
|---|---|---|
| 1,346,148 | Webster | July 13, 1920 |
| 2,175,826 | Brun | Oct. 10, 1939 |
| 2,338,445 | Laucht | Jan. 4, 1944 |
| 2,380,614 | Semon | July 31, 1945 |
| 2,631,102 | Hubbard et al. | Mar. 10, 1953 |
| 2,763,702 | Amos et al. | Sept. 18, 1956 |
| 2,813,147 | Twaddle et al. | Nov. 12, 1957 |
| 2,816,081 | Heath et al. | Dec. 10, 1957 |
| 2,829,165 | Coussemant | Apr. 1, 1958 |
| 2,920,049 | Romanovsky et al. | Jan. 5, 1960 |